US010627021B2

(12) United States Patent
Smith

(10) Patent No.: US 10,627,021 B2
(45) Date of Patent: Apr. 21, 2020

(54) MODULAR PRECAST PIPE

(71) Applicant: Murray Smith, Beaverlodge (CA)

(72) Inventor: Murray Smith, Beaverlodge (CA)

(*) Notice: Subject to any disclaimer, the term of this patent is extended or adjusted under 35 U.S.C. 154(b) by 318 days.

(21) Appl. No.: 15/626,251

(22) Filed: Jun. 19, 2017

(65) Prior Publication Data

US 2018/0363810 A1  Dec. 20, 2018

(51) Int. Cl.
*F16L 9/00* (2006.01)
*F16L 9/22* (2006.01)
*F16L 21/06* (2006.01)
*E03F 3/04* (2006.01)
*F16L 9/08* (2006.01)

(52) U.S. Cl.
CPC ............. *F16L 9/22* (2013.01); *F16L 9/006* (2013.01); *F16L 21/06* (2013.01); *E03F 3/04* (2013.01); *F16L 9/08* (2013.01)

(58) Field of Classification Search
CPC ... F16L 9/22; F16L 9/003; F16L 9/006; F16L 9/08; F16L 23/12; F16L 23/14; F16L 49/02
USPC .......... 285/148.1, 144.1, 230, 411, 414, 415, 285/408
See application file for complete search history.

(56) References Cited

U.S. PATENT DOCUMENTS

| 518,648 A | 4/1894 | Hopler |
| 770,236 A | 9/1904 | Lauridtzen |
| 828,917 A | 8/1906 | Bardon et al. |
| 854,397 A | 5/1907 | Beach et al. |
| 1,003,759 A * | 9/1911 | Lauritzen ................. F16L 9/22 110/184 |
| 1,334,484 A | 3/1920 | Charliss |
| 1,443,292 A * | 1/1923 | Sweney .................. F16L 9/003 285/330 |
| 1,535,162 A * | 4/1925 | Kime ....................... F16L 9/22 138/158 |
| 1,572,197 A * | 2/1926 | Ferguson ................. F16L 9/22 138/101 |
| 1,575,180 A * | 3/1926 | Perkins ............... F16L 25/0027 285/230 |
| 1,642,417 A * | 9/1927 | Kovanda .................. F16L 9/22 110/184 |
| 1,683,025 A * | 9/1928 | Dallam ..................... F16L 9/22 110/184 |

(Continued)

FOREIGN PATENT DOCUMENTS

DE   4418515 A1   11/1995
JP   7238528      9/1995

*Primary Examiner* — Aaron M Dunwoody
(74) *Attorney, Agent, or Firm* — Michael Bujold; Davis & Bujold, PLLC

(57) ABSTRACT

A modular pipe and a method of installing the pipe uses a first pipe section positioned in end to end relation with a second pipe section, the first and second pipe sections being precast from a cement-based material, wherein each pipe section has an outer surface, a flow passage, a first end, and a second end. Each end has a connection profile, an axis, and an end face that is perpendicular to the axis. A collar surrounds and secures the connection between adjacent ends. The collar is constructed from a plurality of collar elements. Each collar element overlaps the pipe connection and engages the connection profile along a portion of the perimeter of each of the first end of the second pipe section and the second end of the first pipe section.

17 Claims, 8 Drawing Sheets

(56) References Cited

U.S. PATENT DOCUMENTS

| | | | | |
|---|---|---|---|---|
| 1,694,736 A | * | 12/1928 | Brown | F16L 9/003 |
| | | | | 138/100 |
| 2,378,593 A | * | 6/1945 | Stuart | F16L 9/08 |
| | | | | 138/145 |
| 2,872,035 A | * | 2/1959 | Tatsch | F16L 9/22 |
| | | | | 206/321 |
| 4,011,726 A | | 3/1977 | Cooper, Jr. | |
| 4,076,283 A | * | 2/1978 | Harrison | F16L 25/0027 |
| | | | | 285/230 |
| 4,116,474 A | * | 9/1978 | Wolf | F16L 21/022 |
| | | | | 285/110 |
| 5,482,403 A | | 1/1996 | Jones et al. | |
| 6,334,736 B1 | | 1/2002 | Johnson et al. | |
| 7,137,756 B1 | | 11/2006 | Jones | |
| 9,228,312 B2 | | 1/2016 | Smith | |
| 2003/0035690 A1 | | 2/2003 | Earl | |
| 2009/0293979 A1 | * | 12/2009 | Scott | F16L 9/22 |
| | | | | 138/98 |

* cited by examiner

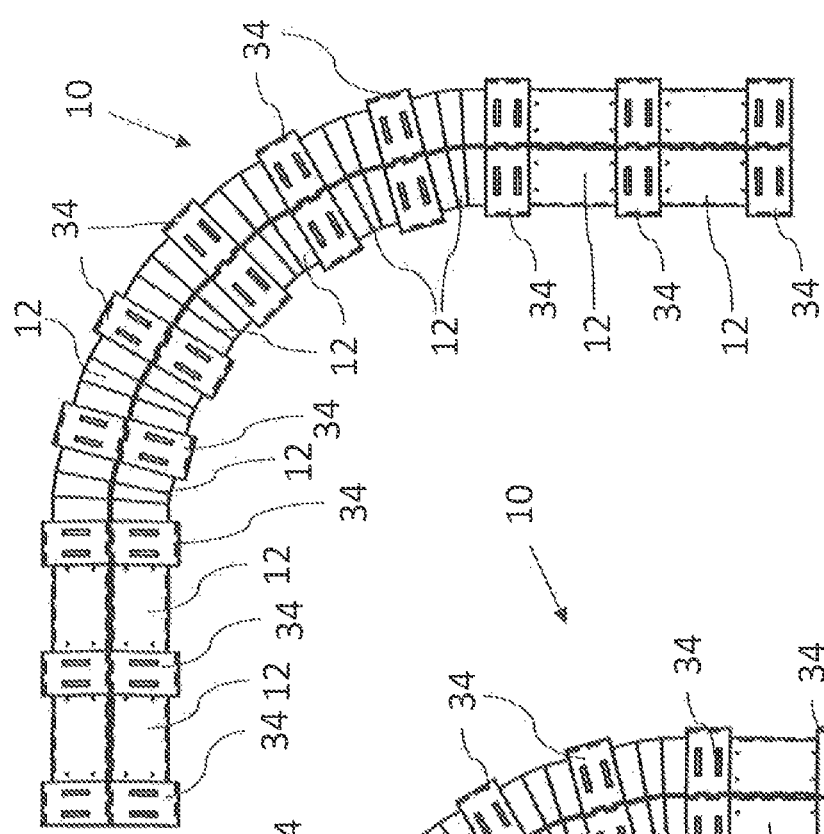
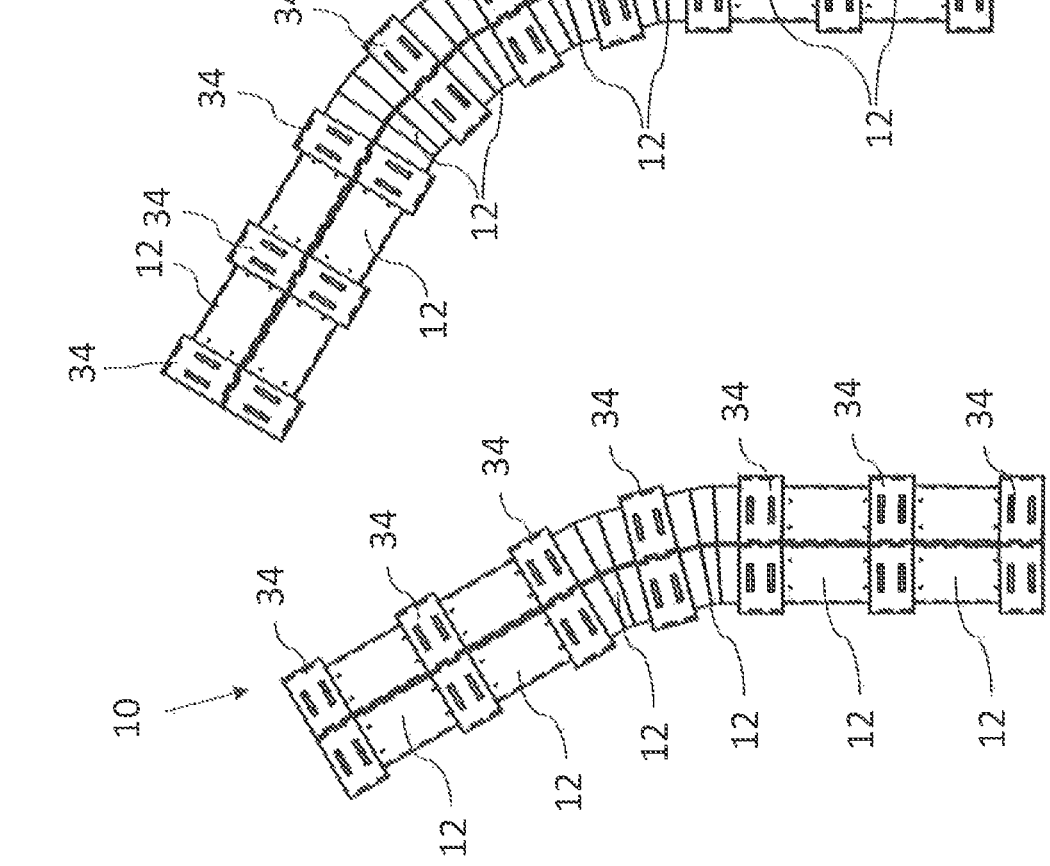
FIG. 6
FIG. 5
FIG. 4

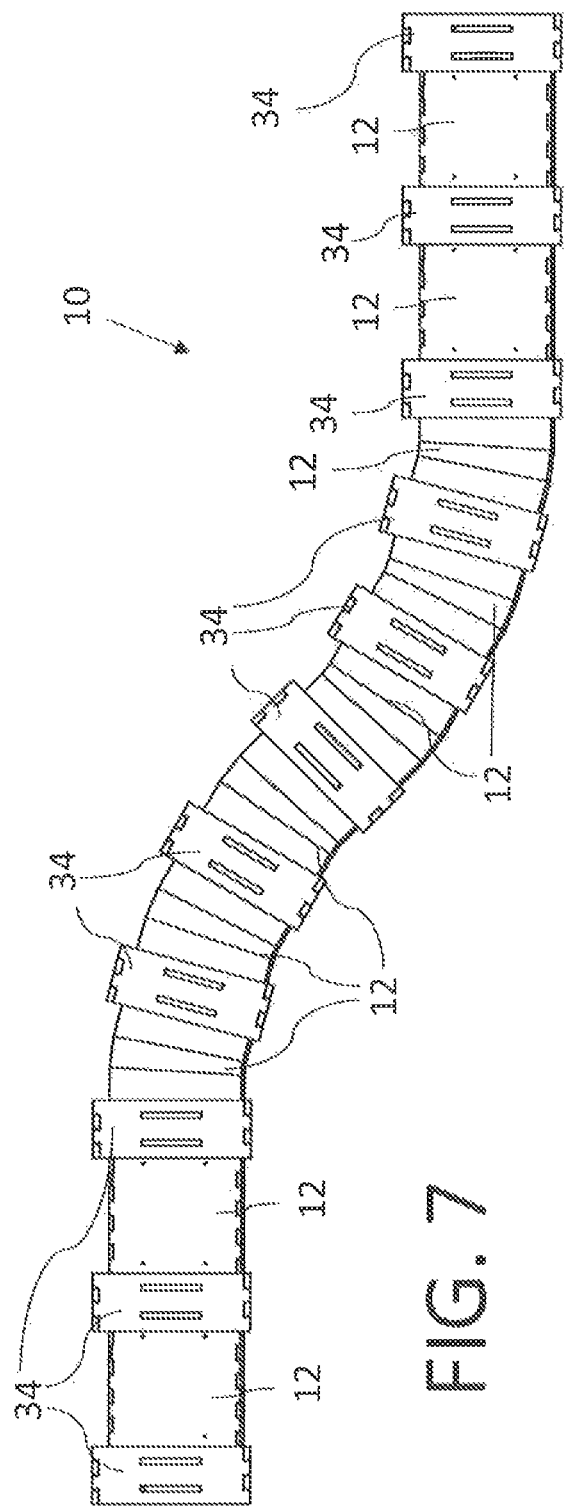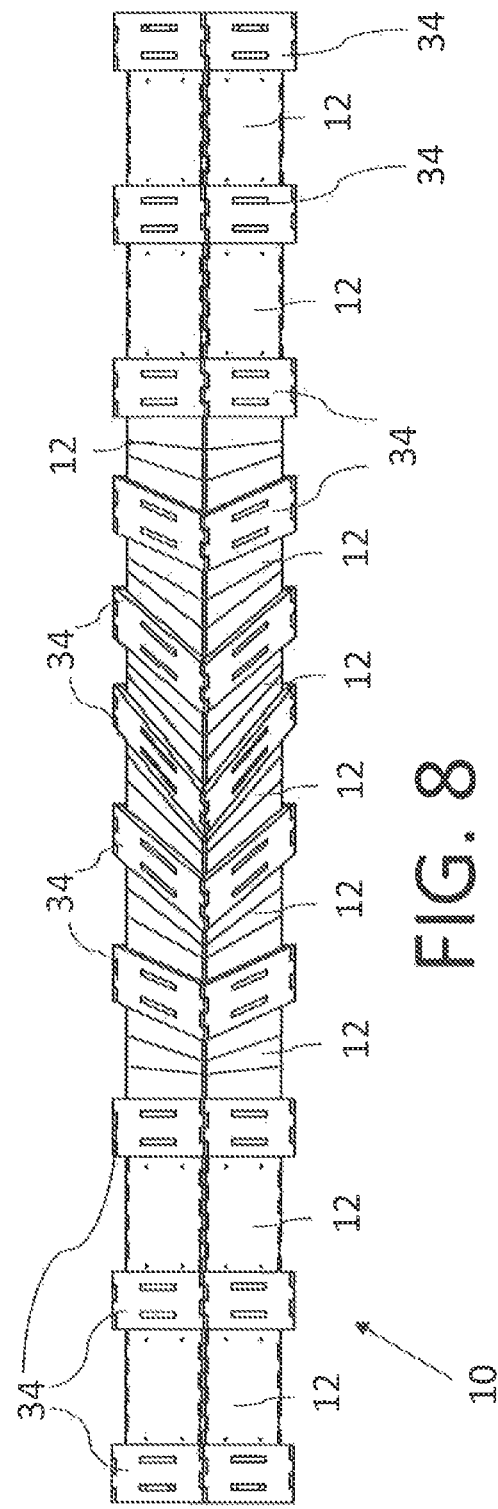

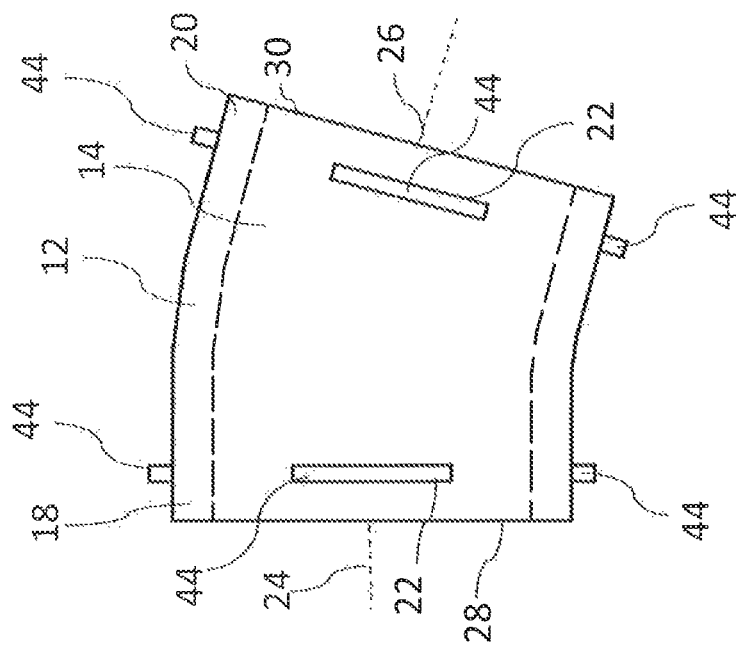
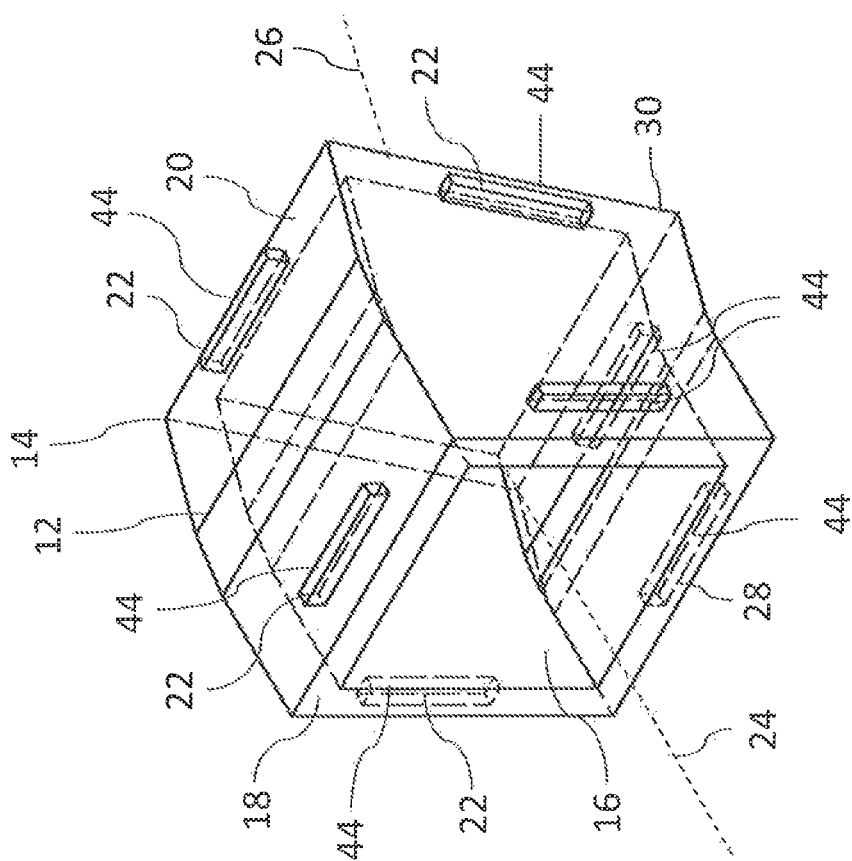

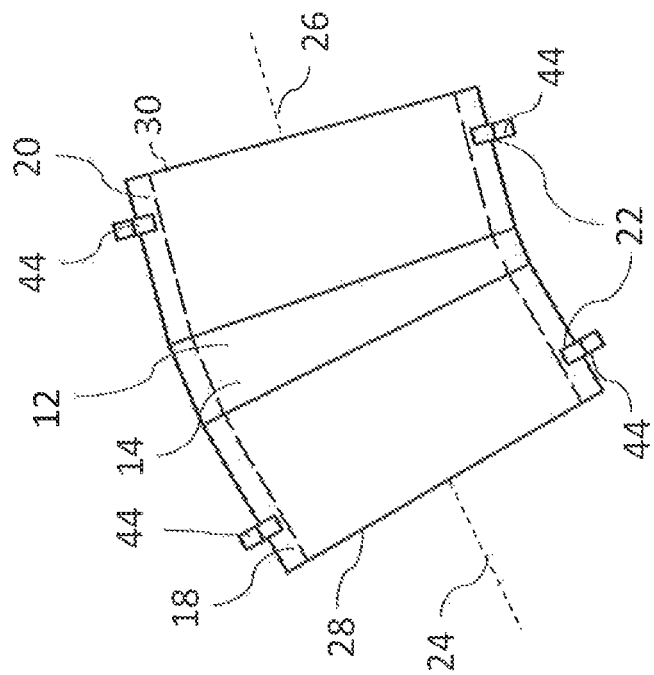
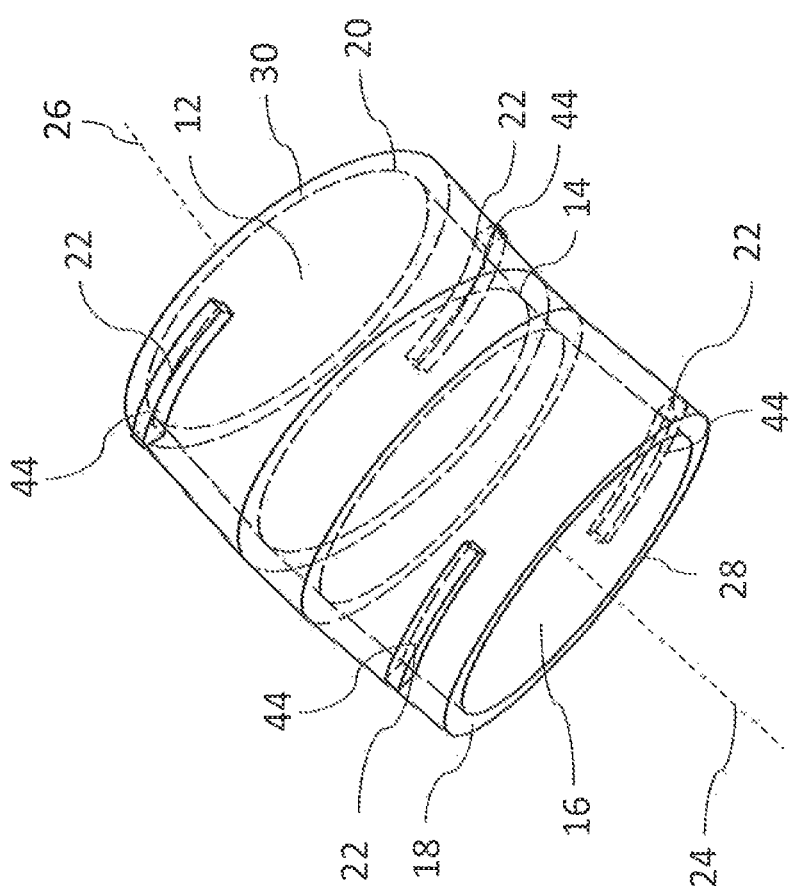

MODULAR PRECAST PIPE

TECHNICAL FIELD

This relates to a modular pipe, such as may be used for sewer or drainage applications.

BACKGROUND

Precast pipe sections are commonly used to form underground pipes, such as for sewers and storm drains. One examples of a precast pipe can be found in U.S. Pat. No. 5,482,403 (Jones et al.) entitled "Sewer construction and pipe encasement therefor", where pipe sections are assembled by inserting one end into a larger end of an adjacent pipe. Another example can be found in U.S. Pat. No. 7,137,756 (Jones) entitled "Fluid-tight bell-and-spigot-joint for box culverts", in which adjacent sections are connected using a male-female connection that seals when connected.

SUMMARY

According to an aspect, there is provided a modular pipe, comprising a first pipe section positioned in end to end relation with a second pipe section, the first and second pipe sections being precast from a cement-based material. Each pipe section has an outer surface, a flow passage, a first end, and a second end. Each of the first end and the second end comprise a connection profile on the outer surface, an axis, and an end face that is perpendicular to the axis. The first end of the second pipe section and the second end of the first pipe section meeting at a pipe connection, and a collar surrounds and secures the pipe connection. The collar is constructed from a plurality of collar elements, wherein each collar element has an inner surface that, when installed, overlaps the pipe connection and engages the connection profile along a portion of the perimeter of each of the first end of the second pipe section and the second end of the first pipe section.

According to another aspect, there is provided a method of assembling a modular pipe, comprising the steps of: positioning a first pipe section in end to end relation with a second pipe section, the first and second pipe sections being precast from a cement-based material, wherein each pipe section has an outer surface, a flow passage, a first end, and a second end, each of the first end and the second end comprising a connection profile on the outer surface, an axis, and an end face that is perpendicular to the axis; positioning the first and second pipe sections such that the first end of the second pipe section and the second end of the first pipe section meet at a pipe connection; and assembling a collar to surround and secure the pipe connection, the collar being assembled by installing a plurality of collar elements around the first and second pipe sections, each collar element having an inner surface that overlaps the pipe connection and engages the connection profile along a portion of the perimeter of each of the first end of the second pipe section and the second end of the first pipe section.

According to other aspects, which may be used alone or in combination, the first end of each pipe section may comprises a protruding lip and the second end may comprise a recess that receives the protruding lip; at least one of the first pipe section and the second pipe section may be angled or curved such that the axis of the first end is at a non-parallel angle relative to the axis of the second end; there may be a plurality of angled or curved pipe sections connected, where the number of pipe sections is selected to achieve a desired radius of curvature for the modular pipe; each pipe section may comprise a multi-sided body or a round body; where the pipe section is a multi-sided body, each side of the multi-sided body may be engaged by one of the collar elements, and adjacent collar elements may be connected end to form an enclosure around the multi-sided body; the connection profile of each end of each pipe section may comprise a plurality of protrusions that are engaged by corresponding recesses in the inner surface of the collar elements; and each end of the collar element may comprise engagement teeth, wherein adjacent collar elements are engaged by interleaving, and pin connecting, the engagement teeth.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 4 is a top plan view of a modular precast pipe with a 30 degree bend.

FIG. 5 is a top plan view of a modular precast pipe with a 60 degree bend.

FIG. 6 is a top plan view of a modular precast pipe with a 90 degree bend.

FIG. 7 is a side elevation view of a modular precast pipe of an elevation curve.

FIG. 8 is a top plan view of a modular precast pipe of an elevation curve.

FIG. 9 is a partially transparent, perspective view of a square, precast pipe section.

FIG. 10 is a plan view of a square pipe section.

FIG. 12 is a partially transparent, perspective view of a circular, precast pipe section.

FIG. 13 is a plan view of a circular pipe section.

DETAILED DESCRIPTION

Figure 2:
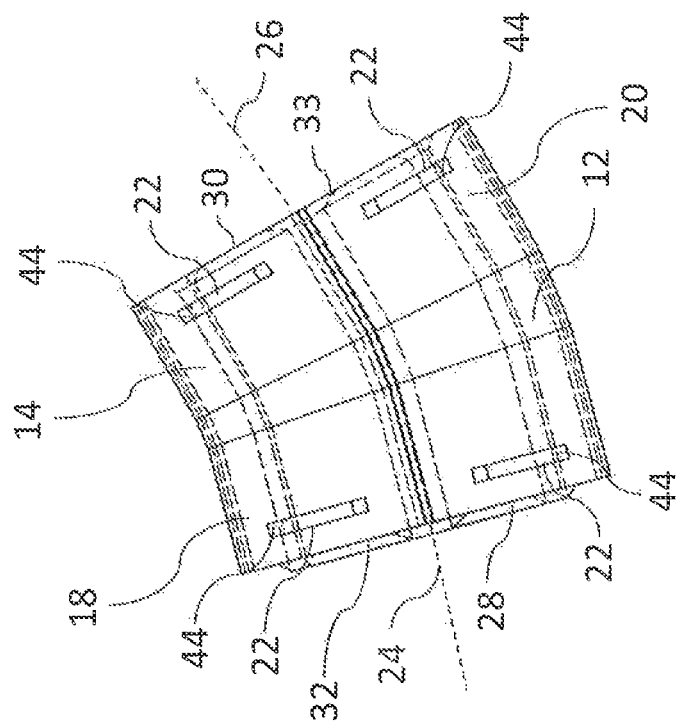
FIG. 2 is a partially transparent, plan view of a triangular pipe section.

A modular precast pipe, generally identified by reference numeral 10, will now be described with reference to FIG. 1 through 14.

Referring to FIG. 4, modular pipe 10 is assembled from pipe sections 12 that are precast from a cement based material. As is common in the industry, the cement based material may be concrete, which is a mixture of Portland cement and sand or another type of aggregate. Other known types of materials that are suitable for the intended purpose may also be used to form pipe sections 12. Pipe sections 12 may be straight or curved in order to allow various curves and changes in elevation to be achieved, examples of which can be seen in FIG. 4-8. Pipe sections 12 are preferably cast as a unitary body in order to enhance structural integrity and water tightness.

Figure 1:
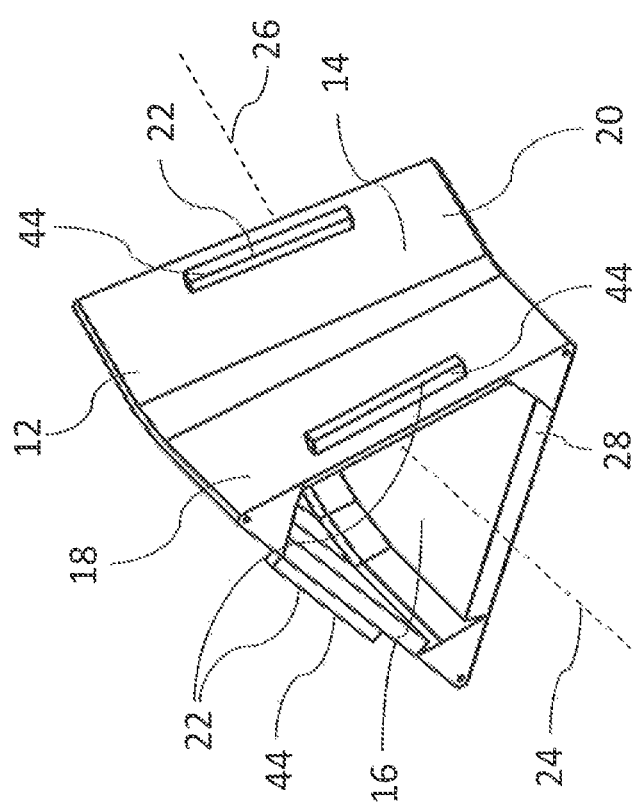
FIG. 1 is a perspective view of a triangular, precast pipe section.
Figure 3:
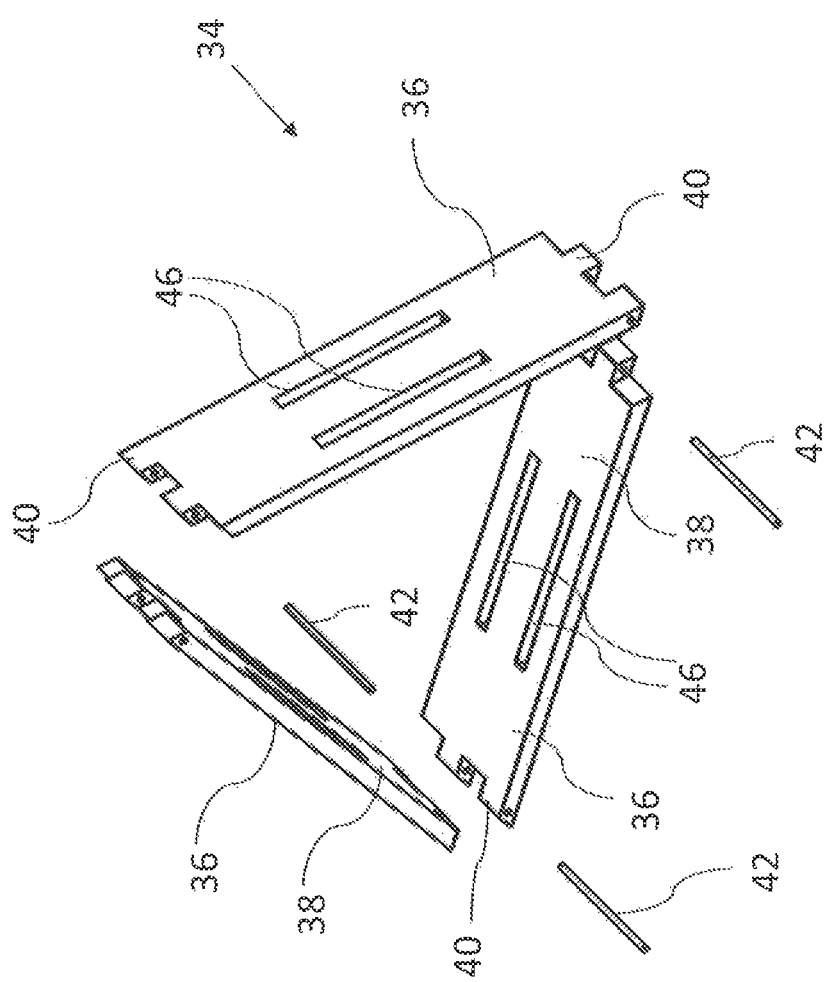
FIG. 3 is a perspective, exploded view of a collar that connects to triangular pipe sections.
Figure 11:
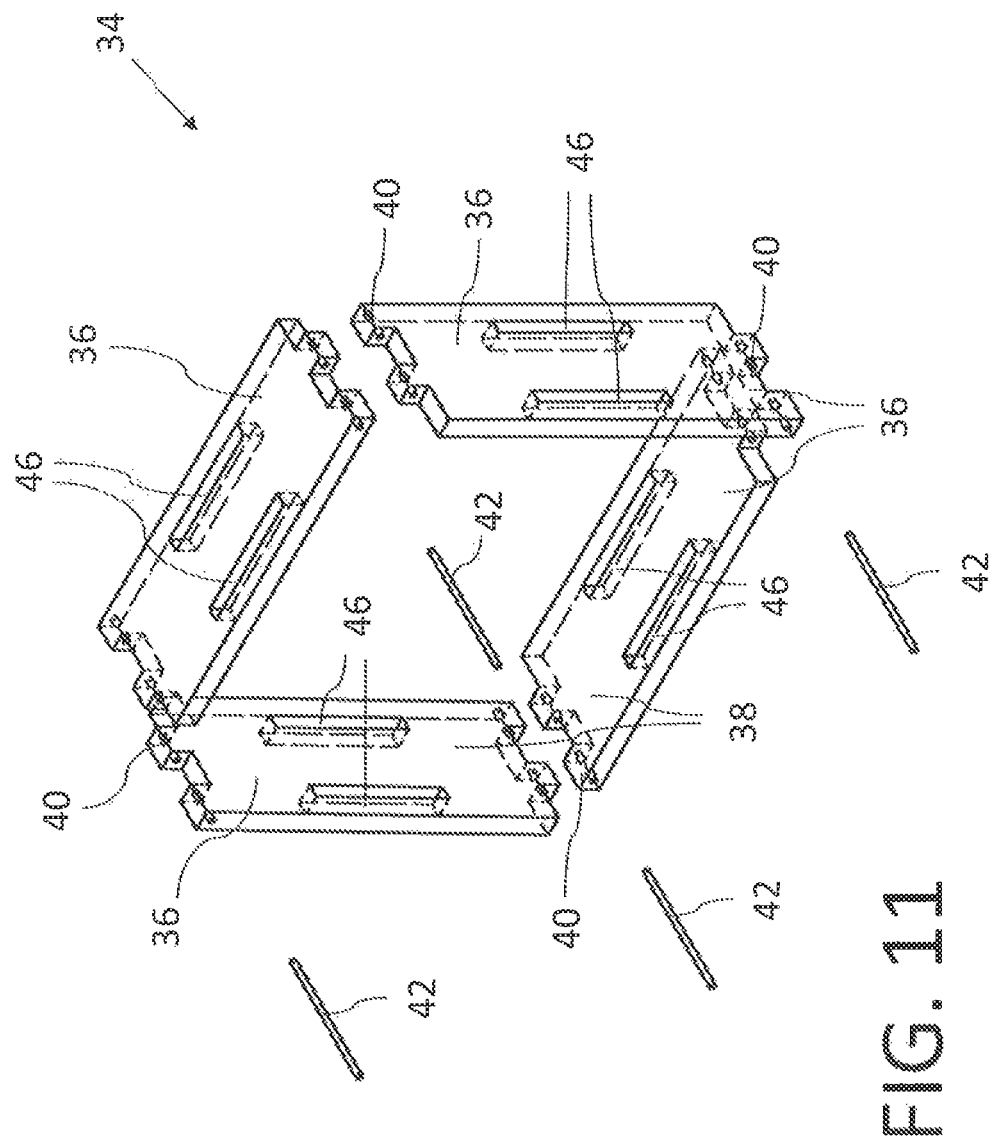
FIG. 11 is a perspective, exploded view of a collar that connects to square pipe sections.
Figure 14:
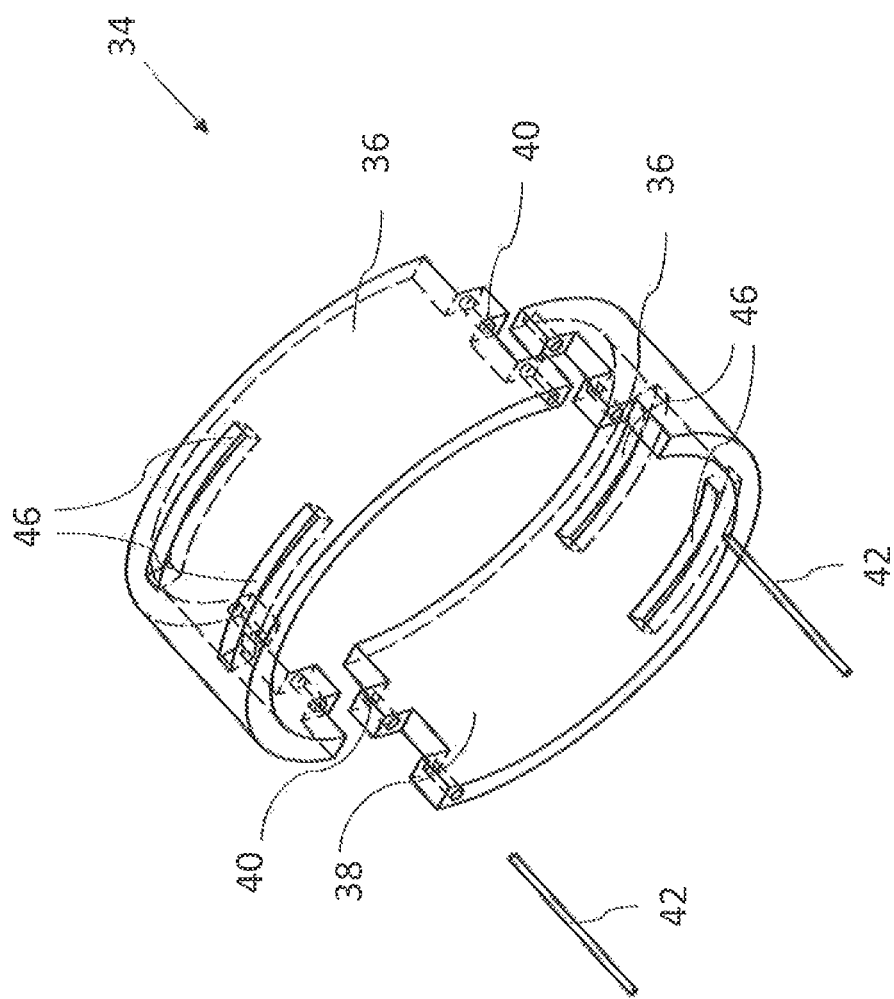
FIG. 14 is a perspective, exploded view of a collar that connects to circular pipe sections.

Referring to FIGS. 1 and 2, pipe sections 12 have an outer surface 14, a flow passage 16, a first end 18, and a second end 20. Each end 18 and 20 has a connection profile 22 on outer surface 14, an axis 24/26, and an end face 28/30 that is perpendicular to axis 24/26. As can be seen, connection profile 22 is preferably the same at both ends 18 and 20, although it may also be possible to design pipe sections 12 with different profiles 22 at either end. Referring to FIG. 4, in order to facilitate the pipe connections between adjacent pipe sections 12, end faces 28 and 30 are perpendicular to the respective axis 24 and 26. In some circumstances, it may be desirable to provide end faces 28 and 30 with a profile that helps seal the pipe 10 when assembled. As shown, end face 28 has a protrusion 32, and end face 30 has a recess 33 that receives protrusion 32.

Pipe sections 12 are connected together using a collar 34 that surrounds and secures the pipe connection. As shown, collar 34 is constructed from a plurality of collar elements 36. Each element 36 has an inner surface 38 that, when installed, overlaps the pipe connection and engages a portion of connection profile 22 or in other words, along a portion of the perimeter of the pipe sections 12. When connected together, collar elements 36 form collar 34, and is preferably designed to provide a similar effect to a connection using a male to female connection. Collar elements 36 are modular to facilitate assembly, and are therefore preferably all made to be the same size and shape. Collar elements 36 may also be made to have different shapes, such as a different design for a collar element 36 that is to be installed as a base on the bottom side of pipe sections 12, however multiple collar elements 36 are used as segments of collar 34 to surround and preferably form an enclosure around the connection between pipe sections 12.

As shown, connection profile 22 may be manufactured as a series of protrusions 44, and collar elements 36 may be made with corresponding recesses 46, such as openings that pass through collar elements 36 as shown. Other designs may also be used.

As shown, collar elements 36 are connected in end-to-end relation around the connection of pipe sections 12. While different designs may be used, the depicted embodiment has engagement teeth 40 that are interleaved, and are then pin connected using pins 42, such as rods, dowels, bolts, screws, etc., that pass through engagement teeth 40 to hold collar elements 36 together.

For those pipe sections 12 are designed with an angle or a curve, axes 24 and 26 are not parallel, but are angled relative to each other. Referring to FIG. 4, pipe sections 12 are positioned in end to end relation with other pipe sections to form pipe 10. By providing some pipe sections 12 with angles and others as straight, various curves and changes in elevation can be achieved, as required. In the depicted example, the curvature of each pipe section 12 is 15 degrees, which allows the user to easily install multiples of this angle, such as commonly used curves of 30 degrees, 45 degrees, and 90 degrees based on the number of units that are installed. Bends other than 15 degrees may also be used.

The desired curve can be achieved while using a consistent inner bore size. This design allows for the reduction of flow turbulence of the fluid, thereby increasing flow efficiency. Using pipe sections 12 with smaller angles may also be used to improve efficiency by minimizing disruption and turbulence in the flow through pipe 10. This design is not limited to 15° collar-bend increments As will be understood, pipe 10 may have different profiles. In FIG. 1-8, pipe 10 is shown to have a triangular cross-section, while in FIG. 9-11, pipe 10 is shown to have a square cross-section, and in FIG. 12-14, pipe 10 is shown to have a circular cross-section. Other shapes may also be used in addition to those depicted. Collar 34 will be designed to match the shape of pipe 10. For example, when pipe 10 is a multi-sided object with flat sides, collar elements 36 preferably have flat inner surfaces, and such that each collar element 36 is flat and positioned along each side of pipe 10.

When installing pipe 10, the modular design limits the number of shapes that may be required. For example, the supply of pipe sections 12 may include straight sections and curved or angled sections, while collar elements 36 will be the same for each pipe connection to be secured. The overall layout of pipe 10 can then be planned, and implemented using the necessary pipe sections 12. Note that, in the case of pipe sections 12 that are symmetrical about two axes, such as round or square versions, pipe sections 12 that are angled may be re-oriented simply by turning, such that it may be possible to provide only straight and curved pipe sections 12, with the installer manipulating the orientation of each as required to achieve the overall design. This also requires connection profile 22 to align with corresponding profiles on adjacent pipe section 12 to allow collar elements 36 to be connectable. Alternatively, there may be two or more types of curved pipe sections made available, depending on whether the curve is up or down, or left or right. These decisions will be based primarily on economic considerations, marketability, and preferences of the users.

The connections between connection profile 22 and collar elements 36 are preferably a loose connection, which allows for limited relative movement of adjacent pipe sections 12. For example, the openings in collar elements 36 may be slightly oversized relative to the protrusions on pipe sections 12 to allow for some relative movement. This assist in installation, as pipe sections 12 may be repositioned in a limited way in order to accommodate the location, and also provides some flexibility and protection against damage due to earth tremors, heaving or settling as may occur from time to time.

During installation, it may be desirable to apply a compound to the joints to improve the seal between pipe sections 12. Preferably, the compound will be somewhat flexible or elastic to accommodate some shifting of pipe 12 without breaking the seal.

The modular pipe described herein may be used for applications such as sewer or drainage pipe. With the ability to address elevation changes and traverse corners, the modular pipe may also be used to provide secondary confinement to an existing pipe, which may be useful with oil or gas pipelines. The modular components with their semi-loose fitting may allow for a pipe that is non-rigid to allow for stress relief, which may be useful in areas subject to stresses due to earth tremors, heaving, etc. As the design has a tendency to return to its original state, the modular pipe may recover after the stresses have been removed. Traditional rigid construction, when subject to undesired forces, may tend to crack, shear, or fracture without stress relief.

The modular pipe described herein may also be installed with a material to act as insulation and/or cushioning, such as Styrofoam™ or a Styrofoam-like product, to retain heat and cushion impact in an earth tremor event. The material will limit the environmental impact. This design may allow reduce the risk of fracturing present with surface installations, as well as reduce the fracturing problem that has occurred in transition from surface to buried line or vice versa, such as have been experienced in the Alaska Pipeline systems. In existing systems, corners in sewer and drainage pipe have been achieved by using junction boxes, which have entrances and exits at the desired degree of change. This design causes turbulence in the product and a resulting drop in efficiency, which limits the capacity of the pipe. By providing changes of direction in increments as described above, the amount of turbulence may be reduced.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A modular pipe, comprising:
a first pipe section positioned in end to end relation with a second pipe section, the first and second pipe sections being precast from a cement-based material, wherein each pipe section has an outer surface, a flow passage, a first end, and a second end, each of the first end and the second end comprising:
a connection profile on the outer surface;
an axis; and
an end face that is perpendicular to the axis;
the first end of the second pipe section and the second end of the first pipe section meeting at a pipe connection; and
a collar that surrounds and secures the pipe connection, the collar being constructed from a plurality of collar elements, wherein each collar element has an inner surface that, when installed, overlaps the pipe connection and engages the connection profile along a portion of a perimeter of each of the first end of the second pipe section and the second end of the first pipe section;
wherein at least one of the first pipe section and the second pipe section are angled or curved, such that the axis of the first end is at a non-parallel angle relative to the axis of the second end.

2. The modular pipe of claim 1, wherein first end of each pipe section comprises a protruding lip, and the second end comprises a recess that receives the protruding lip.

3. The modular pipe of claim 1, comprising a plurality of angled or curved pipe sections connected, a sufficient number of pipe sections being selected to achieve a desired radius of curvature for the modular pipe.

4. The modular pipe of claim 1, wherein each pipe section comprise a multi-sided body.

5. The modular pipe of claim 4, wherein each side of the multi-sided body is engaged by one of the collar elements.

6. The modular pipe of claim 5, wherein adjacent collar elements are connected end to form an enclosure around the multi-sided body.

7. The modular pipe of claim 1, wherein the connection profile of each end of each pipe section comprises a plurality of protrusions that are engaged by corresponding recesses in the inner surface of the collar elements.

8. The modular pipe of claim 1, wherein each end of each collar element comprises engagement teeth, wherein adjacent collar elements are engaged by interleaving, and pin connecting, the engagement teeth.

9. A method of assembling a pipe, comprising the steps of:
positioning a first pipe section in end to end relation with a second pipe section, the first and second pipe sections being precast from a cement-based material, wherein each pipe section has an outer surface, a flow passage, a first end, and a second end, each of the first end and the second end comprising:
a connection profile on the outer surface;
an axis; and
an end face that is perpendicular to the axis; and
wherein a least one of the first pipe section and the second pipe section are angled or curved, such that the axis of the first end is at a non-parallel angle relative to the axis of the second end and the first and second pipe sections are positioned such that the first end of the second pipe section and the second end of the first pipe section meet at a pipe connection; and
assembling a collar to surround and secure the pipe connection, the collar being assembled by installing a plurality of collar elements around the first and second pipe sections, each collar element having an inner surface that overlaps the pipe connection and engages the connection profile along a portion of the perimeter of each of the first end of the second pipe section and the second end of the first pipe section.

10. The method of claim 9, wherein first end of each pipe section comprises a protruding lip, and the second end comprises a recess that receives the protruding lip.

11. The method of claim 9, comprising a plurality of angled or curved pipe sections connected, a sufficient number of pipe sections being selected to achieve a desired radius of curvature for the pipe.

12. The method of claim 9, wherein each pipe section comprise a multi-sided body.

13. The method of claim 12, wherein each side of the multi-sided body is engaged by one of the collar elements.

14. The method of claim 13, wherein adjacent collar elements are connected end to form an enclosure around the multi-sided body.

15. The method of claim 9, wherein the connection profile of each end of each pipe section comprises a plurality of protrusions that are engaged by corresponding recesses in the inner surface of the collar elements.

16. The method of claim 9, wherein each end of each collar element comprises engagement teeth, wherein adjacent collar elements are engaged by interleaving, and pin connecting, the engagement teeth.

17. A modular pipe, comprising:
a first pipe section positioned in end to end relation with a second pipe section, the first and second pipe sections being precast from a cement-based material, wherein each pipe section has an outer surface, a flow passage, a first end, and a second end, each of the first end and the second end comprising:
a plurality of protrusions on the outer surface that define a connection profile;
an axis; and
an end face that is perpendicular to the axis;
the first end of the second pipe section and the second end of the first pipe section meeting at a pipe connection; and
a collar that surrounds and secures the pipe connection, the collar being constructed from a plurality of collar elements, wherein each collar element has an inner surface that comprises a plurality of recesses that correspond to the plurality of protrusion such that, when installed, the collar overlaps the pipe connection and engages the connection profile along a portion of a perimeter of each of the first end of the second pipe section and the second end of the first pipe section.

* * * * *